UNITED STATES PATENT OFFICE.

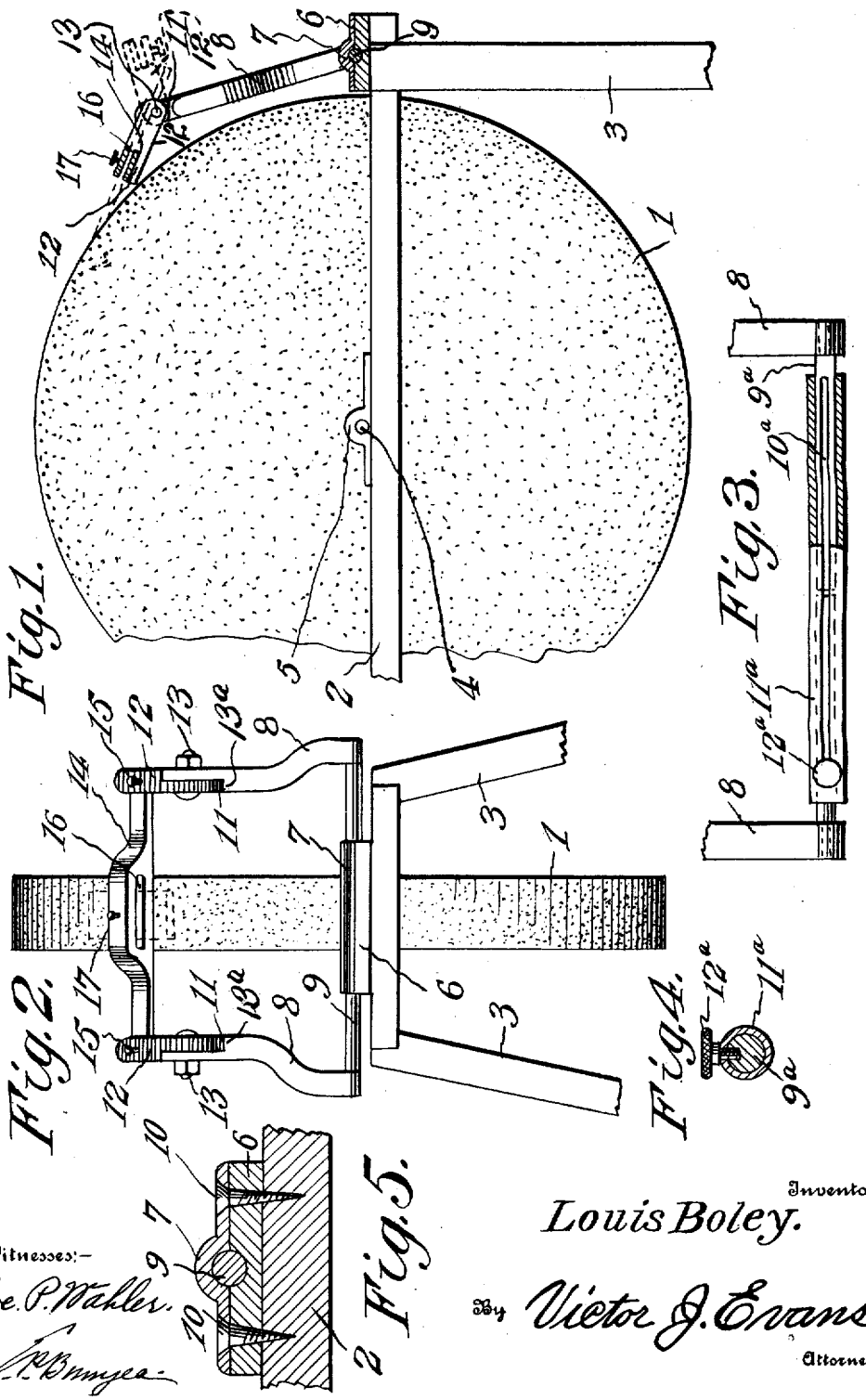

LOUIS BOLEY, OF OHIO CITY, OHIO.

TOOL-HOLDER.

No. 903,048.　　　Specification of Letters Patent.　　　Patented Nov. 3, 1908.

Application filed February 21, 1908. Serial No. 417,095.

*To all whom it may concern:*

Be it known that I, LOUIS BOLEY, a citizen of the United States of America, residing at Ohio City, in the county of Van Wert and State of Ohio, have invented new and useful Improvements in Tool-Holders, of which the following is a specification.

This invention relates to tool holders for grindstones, and one of the principal objects of the same is to provide simple and reliable means for holding chisels, plane bits, drawing knives and other tools in adjusted positions upon the face of a grindstone so that the required bevel will be given to the cutting edge.

Another object of the invention is to provide simple adjustable means for holding various tools to a grindstone so that the required bevel is formed on the cutting edge of the tool, while one or both hands of the operator are free to turn the grindstone.

These and other objects may be attained by means of the construction illustrated in the accompanying drawing, in which,—

Figure 1 is a side elevation of a grindstone, showing my adjustable tool holder in place on the grindstone frame, the tool holder being shown in section. Fig. 2 is an end view of the same. Fig. 3 is a detail view of a modified form of extensible or adjustable tool holding frame. Fig. 4 is a detail view of the set screw for holding the telescopic members of the adjustable frame in position. Fig. 5 is a detail section showing the supporting device for the tool holder frame.

Referring to the drawing for a more specific description of my invention, the numeral 1 designates the grindstone, and 2 is the frame in which the stone is mounted, and 3 are the legs of the frame. The grindstone is provided with a suitable axle 4 which is journaled at opposite sides in a keeper 5 secured to the frame of the grindstone. A crank handle may be used for turning the grindstone.

Suitably mounted in a keeper 6 having a removable upper member 7 is a yoke 8, said yoke consisting of a connecting bar 9 which is mounted in the keeper 6 and held in place by means of the screws 10. The arms of the yoke 8 are at their upper ends rabbeted, as at 11, and secured to said rabbeted ends are the members 12, pivoted at 13 to the arms of the yoke 8. The rabbeted ends thus form stop shoulders 13$^a$ for a purpose to be hereinafter described. The members 12 are provided with a tool holder 14, said tool holder being connected to the members 12 by means of set screws 15 and said tool holder being provided with a suitable slot 16 for a plane bit or other blade which is held in place by means of a set screw 17.

The operation of my invention may be briefly described as follows:—The bit or other suitable tool to be ground is placed in the slot 16, and the set screw 17 is made to engage the same. The tool holder 14 is tipped toward the stone or away from the same to the required degree to give the necessary bevel to the tool, and when this point has been determined the nuts on the screws 13 are tightened up to hold the frame in the required position.

As shown in Fig. 3, the yoke bars 8 are connected by a rod 9$^a$ and provided with a set screw 12$^a$. This construction permits of the lateral movement of the tool holder and means whereby the same may be held in adjusted positions.

By the provision of the stop shoulders, it is obvious that the members 12 may be swung on the bolts 13 and moved rearwardly of the grind stone and their movement will be limited by their engagement with the said stop shoulders in order that the tool holder can be held stationary during the operation of inserting a tool to be operated upon by the grind stone.

From the foregoing it will be obvious that a tool holder made in accordance with my invention will hold a tool to a grindstone in the required position to give the necessary bevel to the tool, and at the same time the hands, or at least one of them, is free to turn the grindstone. My tool holder produces excellent work in cases where accuracy is a desideratum.

Having thus described the invention, what is claimed as new, is:—

A grind stone having a supporting frame and a keeper mounted upon said frame, in combination with a yoke comprising parallel spaced arms connected at their lower ends by a connecting bar, said connecting bar being mounted in the said keeper for rotary movement so that the arms can be moved toward or away from the grind stone, said arms having rabbeted upper ends to form stop shoulders, parallel spaced members, clamping bolts engaged with the parallel spaced members and with the rabbeted ends of the arms respectively for holding the members in their adjusted position, said members being adapted to engage the stop shoulders upon the arms to limit the downward movement of the said members, and a tool holder removably mounted at its ends to the arms.

In testimony whereof I affix my signature in presence of two witnesses.

LOUIS BOLEY.

Witnesses:
   Lon Umbaugh,
   Geo. L. Moore.